United States Patent [19]
Duret et al.

[11] Patent Number: 5,781,431
[45] Date of Patent: Jul. 14, 1998

[54] PROCESS AND APPARATUS FOR HIGH SPEED ON THE FLY SUPPLY OF INFORMATION NECESSARY FOR ROUTING DATA STRUCTURES

[75] Inventors: Christian Duret, Chatillon; Lionel Pelamourgues, Paris, both of France

[73] Assignee: France Telecom Etablissement autonome de droit public, Paris, France

[21] Appl. No.: 774,077

[22] Filed: Dec. 23, 1996

Related U.S. Application Data

[63] Continuation of Ser. No. 269,027, Jun. 30, 1994, abandoned.

[30] Foreign Application Priority Data

Jul. 12, 1993 [FR] France .................. 93 08558

[51] Int. Cl.⁶ .................................... G06F 17/00
[52] U.S. Cl. .................... 364/148; 395/800.17
[58] Field of Search .............. 595/800, 800.17; 364/148, 166

[56] References Cited

U.S. PATENT DOCUMENTS

| | | | |
|---|---|---|---|
| 4,490,817 | 12/1984 | Turner | 370/244 |
| 4,652,993 | 3/1987 | Scheuneman | 395/478 |
| 4,685,127 | 8/1987 | Miller | 379/221 |
| 5,130,984 | 7/1992 | Cisneros | 370/94 |
| 5,216,703 | 6/1993 | Roy | 379/59 |
| 5,220,562 | 6/1993 | Takada et al. | 370/85.13 |
| 5,379,297 | 1/1995 | Glover et al. | 370/60.1 |
| 5,390,173 | 2/1995 | Spinney et al. | 370/60 |
| 5,400,331 | 3/1995 | Lucak et al. | 370/85.1 |
| 5,414,834 | 5/1995 | Alexander et al. | 395/600 |
| 5,426,637 | 6/1995 | Derby et al. | 370/85.13 |
| 5,440,547 | 8/1995 | Easki et al. | 370/60 |
| 5,442,630 | 8/1995 | Gagliardi et al. | 370/85.13 |
| 5,490,252 | 2/1996 | Macera et al. | 395/200.01 |

FOREIGN PATENT DOCUMENTS 0 556 148  8/1993  European Pat. Off. .

OTHER PUBLICATIONS

IEE Proceedings E. Computers & Digital Techniques, vol. 135, 1, Jan. 1988, pp. 55–59, P. Wolstenholme, "Filtering of Network Addresses in Real Time by Sequential Decoding".

Proceedings of the IEEE Infocom Conference on Computer Communications, Apr. 7–11, 1991, vol. 2, pp. 515–524, Tong–Bi Pei, et al., VLSI Implenentation of Routing Tables: Tries and CAMS.

*Primary Examiner*—Eric Coleman
*Attorney, Agent, or Firm*—Oblon, Spivak, McClelland, Maier & Neustadt, P.C.

[57] ABSTRACT

The invention relates to a process for the analysis of all or part of the informations contained in data structures or formats in order to supply to an external system the informations necessary for the despatching or routing of said data structures or for the processing thereof by an intelligent external system, in which analysis takes place of the significant fields of said data structures, particularly the source or destination addresses, using the principle of translation tables by successive indirections in a two-dimensional array TRIE $(i, j)$, each line of the array constituting a register having $2^k$ cells, in which k is the length of the addressed segment. In this process, the search in the translation tables takes place with the clock cycle of the entering information by data structure segments.

26 Claims, 14 Drawing Sheets

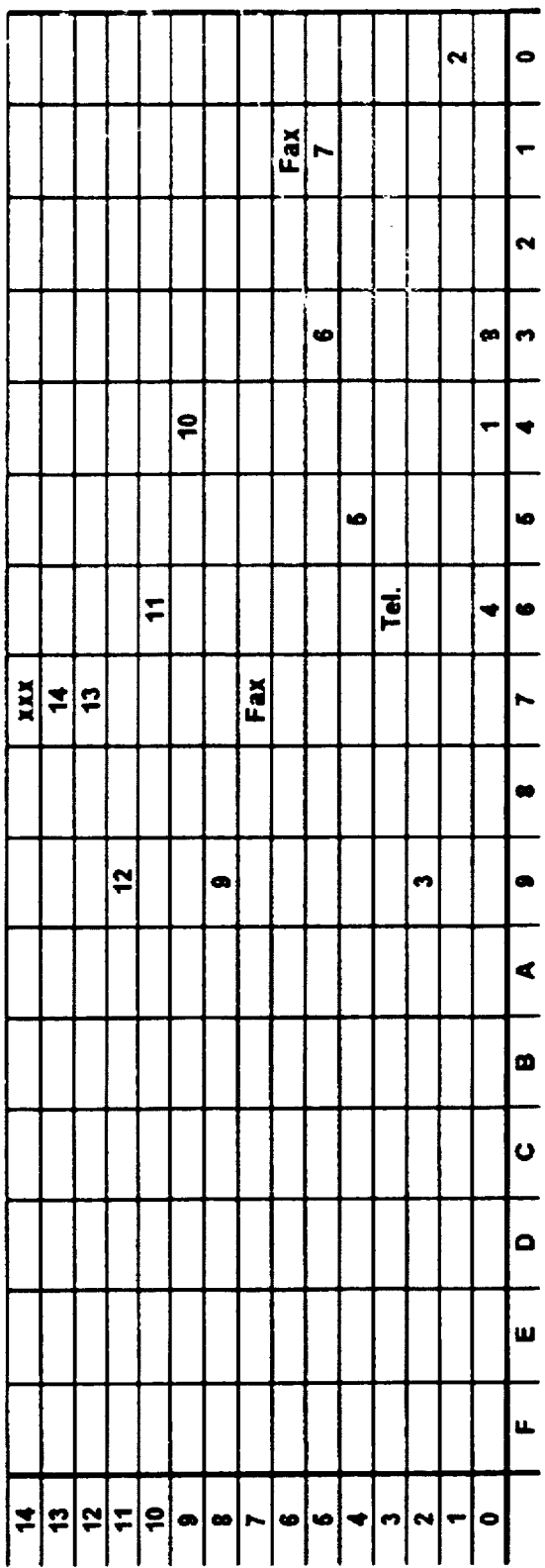
FIG. 1
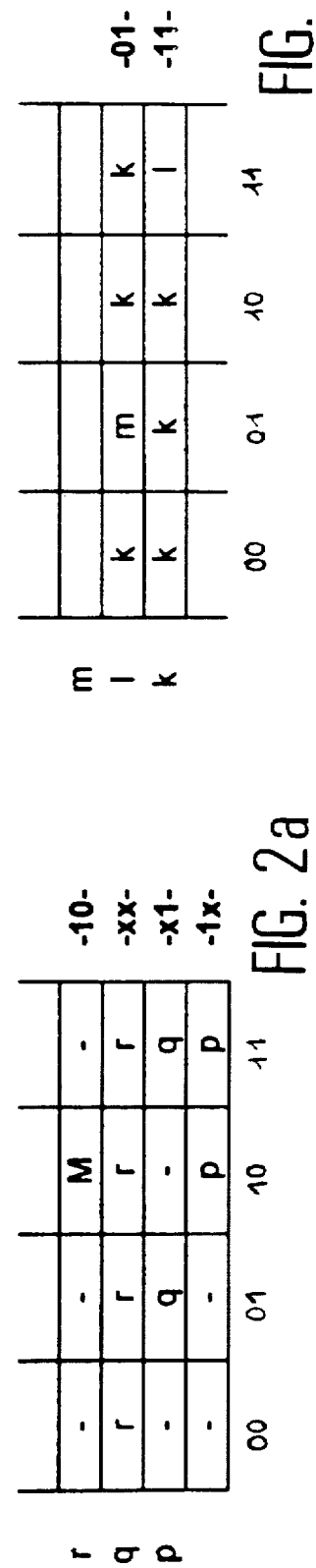
FIG. 2a
FIG. 2b

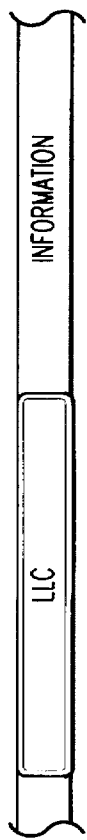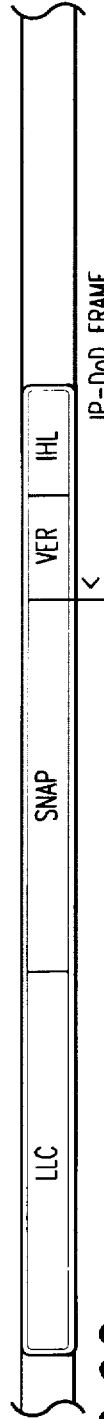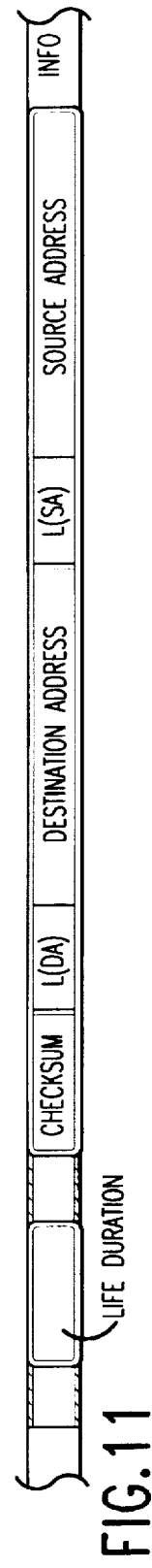

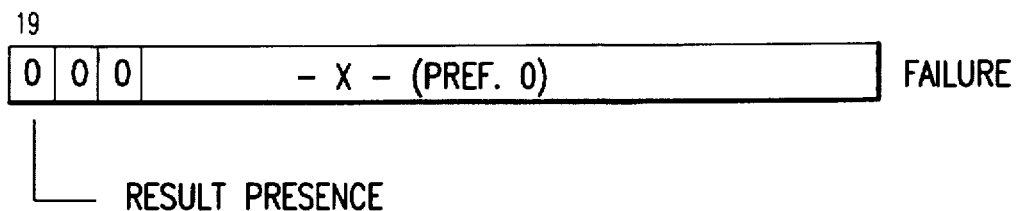
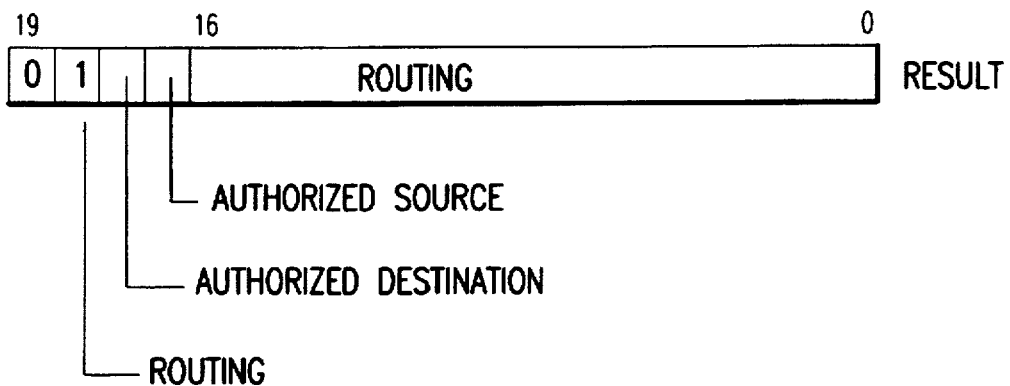
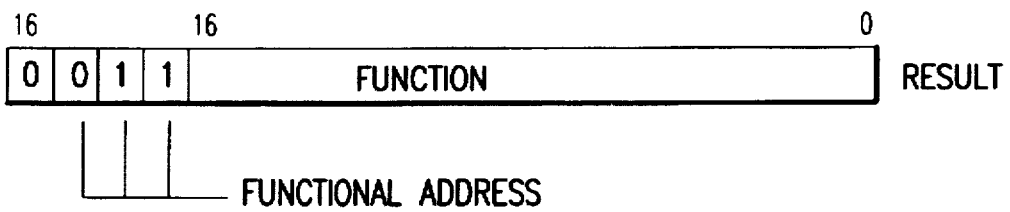
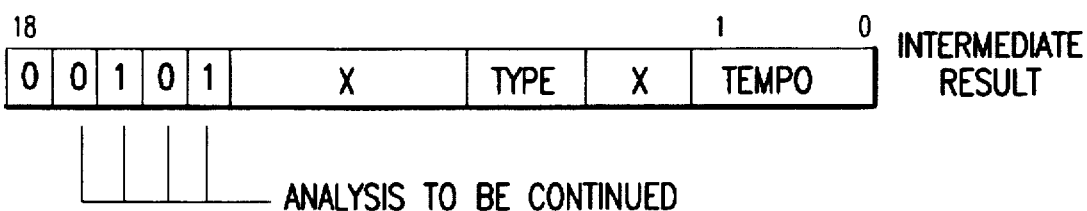
FIG.13A

PROCESS AND APPARATUS FOR HIGH SPEED ON THE FLY SUPPLY OF INFORMATION NECESSARY FOR ROUTING DATA STRUCTURES

This application is a continuation of application Ser. No. 08/269,027, filed on Jun. 30, 1994, now abandoned.

BACKGROUND OF THE INVENTION

1. Field of the Invention

The present invention relates to a process and to an apparatus, of the translator type, for the analysis of data structures making it possible to supply on the fly the information necessary for the routing of such data structures at high speed. This apparatus also makes it possible to supply information elements on the complementary processing operations to be carried out.

2. Discussion of the Background

The translation function in electronic switching aims at supplying the information necessary for the routing and charging of calls presented for dial switching. It takes into account notions of regional, national and international numbering plans, as well as the use of the dialling plan for access to complementary services. Essentially brought about by means of tables interpreted by analysis programs it consequently has, in electronic switching, a power and flexibility making it possible to increase its possibilities even for the translation of numbers belonging to standard dialling plans.

The translation problems are well known in telephone switching:

what is the number of the calling subscriber, knowing the junctor on which the call appears?

what are the class of services of the calling subscriber?

as a function of the number of the called subscriber, on which outgoing trunk is the call to be dispatched?

what type of signalling on the chosen trunk?

what type of charging as a function of the calling subscriber no./called subscriber no.?

knowing the no. of the called subscriber on which junctor is the call to be presented?

These problems are in particular described in the work entitled "La commutation éelectronique" by Grinsec (collection scientifique et technique des télécommunications, volume 2, pages 128–142). The corresponding operations are complex, with a large number of Variants, in real time, but at the telephone dialling speed. The algorithms used, e.g. the pyramidal structure analysis tables, are very fast and close to what will be described hereinafter.

Machine to machine communications in the "connected mode" give rise to the same type of problems. The switches of an x.25 network have mechanisms identical to those of telephone switches for establishing a virtual circuit. All the information packets of the same circuit are then routed in the same way. The life of a virtual circuit is on average much longer than that of a telephone communication.

Machine to machine communications in the connectionless mode are naturally ensured by local computer networks, in which the network is a simple shared medium and the intelligence distributed within the terminals or their attachments to the network. The "connection" (exclusive use of the shared medium) between the machines is only established for the duration of the exchanged data unit varying between a few bytes and a few thousand bytes. The offer of such a service on a large network (regional or national) in partly intermeshed form also requires translation mechanisms at each node of the network, but at a much reduced time scale. In the worst case, the translation operations must last no longer than the minimum time separating the reception of two data units. For example, an Ethernet network can transmit approximately 15000 frames per second and a FDDI network ("Fiber Distributed Digital Interface") up to 500,000. These problems are more particularly described in the work entitled "Computer Networks" by Andrew Tanenbaum (Prentice Hall 1988).

At each node of a network offering connection-less services are found in simplified manner the same functions as summarized in table 1 given at the end of the description and called by analogy with telephone switching "translation" functions.

From the physical standpoint (e.g. ATM or Asynchronous Transfer Mode) for each entering cell it is a question of determining as a function of its virtual circuit identifier (VC, VP) if it can be switched to one or more other virtual circuits, if it is intended for the control of the ATM switch because it contains signalling or administration informations intended for it and finally if the virtual circuit supports an unconnected service, passing it to the MAC (Medium Access Control) level or physical access layer.

At the MAC level, as a function of the destination address in the header, it is possible to deduce if the MAC frame can be routed on an outgoing virtual circuit (MAC frame switching), if it is intended for the control of the bridge or if a processing has to be carried out at the network level after processing the header the data connection layer LLC (or Logical Link Control).

Processing of the LLC level makes it possible to recognize if the frame contains a network level involved (e.g. IP or Internet Protocol) or if it is intended for the control of the router.

At the network level, as a function of the destination address in the header, it is possible to deduce if the frame can be routed to a new MAC destination address on an outgoing virtual circuit or if it is intended for the control of the router.

Above the physical level, each exchanged data unit is accompanied by its source address SA and its destination address DA. The analysis of the destination alone supplies the routing path and that of the source/destination pair part of the informations necessary for call charging or restrictions, e.g. in order to obtain a closed group of users. Routing is to be performed in each node of the network and the call charging at one node only and the discriminations of the closed user group in all or part at the source and destination nodes.

The analysis of all or part of the SA and DA addresses must be carried out in real time. The update of the translation tables has reduced time constraints and can be carried out by the administration of the network (e.g. for the closed user group) at a very slow clock cycle (minute) or at the updating frame exchange cycle (second), if the dynamic routing protocols are realized in the network such as source routing or spanning tree.

The length of the addresses to be analyzed can vary. The usual lengths are as follows:

16 or 48 bits for the MAC addresses of the FDDI, Ethernet, Token ring or Token bus networks;

32 bits for the Internet protocol (IP);

60 bits (CCITT E. 164 recommendation);

80 bits for the XTP protocol;

up to 160 bits for the NSAP (Network Service Access Point) address of the ISO.

In the latter case, the address is prefixed by its length. The analysis depth can vary, e.g.:

complete for the MAC 802x addresses in the public administration mode, partial for the IP-DoD (Internet Protocol Department of Defense) addresses, which can have a hierarchic structure (network, subnetwork in the network, host machine in the subnetwork).

In all cases, the translation functions must supply from a reduced number of active addresses in an addressing space a large amount of information necessary for the routing of a data unit. For example, a FDDI bridge must be able to recognize a few thousand addresses at a given time on $2^{48}$ of the possible addressing space.

Within the scope of connection-less services, outside the routing of the data units, there are identical functions e.g. for call charging: a counter linked with a source address is advanced by an amount dependent inter alia on the source address/destination address pair or for various traffic observations: copy out and forward the frames from a given address to an observation machine.

The connected mode data services call on translation functions within the same level, e.g. DLCI (Data Link Connexion Identifier) entering DLCI output port in the nodes of a network offering a frame relaying service or DLCI entering to VC, VP, output port in the nodes of a network offering said same service, but based on an ATM infrastructure.

The basic operations to be performed on the translation tables are search and updating. The search must be carried out as rapidly as possible with the clock cycle of the entering frames. It is the optimization of the search function which will consequently determine the translation table management method.

There are numerous table organization and search methods:

Tabulation

The table contains the same number of inputs as there are addresses in the addressing space. For each input, it is necessary to store the information associated with the address (existence, routing parameters, etc.). The search is both trivial and ultra fast, as well as the updating. This solution can only be applied if the ratio between the number of active addresses and the number of addresses of the addressing space is not too small.

Sequential Search

The active addresses and associated informations are accumulated in a table with the same number of inputs as active addresses. The search takes place by scanning the table. This is the most compact structure. The updating and search are trivial. Its only disadvantage is an excessive search time, the number of tests at worse being equal to the number of inputs.

Search by Dichotomy (Binary Search)

This method is only applicable if there is an order relationship between the active addresses. The search takes place by determining whether the address belongs to the first or second half of the table by comparing it with the active address stored in the half of the table. This process is reiterated on the table half obtained until coincidence occurs. The number of comparisons is at the most $Log_2M$, in which M is the number of active addresses. Updating is complex, because it requires the rearrangement of the entire table.

Search by Hash Coding (Calculated Access)

An input in the active address table is determined by the calculation of an appropriate access function on the address to be searched. On the basis of the input obtained, there is a sequential search to establish whether the address is present in the group of active addresses having the same access function. The access function must permit access to all the inputs of the table with an equal probability for that method being effective. The average number of comparisons for each search must be close to 1.

Associative Memory (or Content Addressable Memory—CAM)

The comparison with the address to be sought is carried out in parallel on all the active addresses. This process is hard-wired. A comparator is associated with each active register containing an address. The time taken to determine whether the sought address exists is tens of ns. Access to an associated information is possible by an extension of the active address register. Supplementary registers can contain masks in order to exclude address fields from the comparison. The mask is global, the type or depth of analysis having to be known prior to the search. The presently available circuits make it possible to store 256 48bit addresses with an access time of 70 ns or 1024 48bit addresses with access to an associated information of 16 bits in 270 ns.

Implementation

Existing machines generally use a sequential processing without vectorization. A significant part of the calculation power of their processing unit is devoted to the determination of the task to be carried out and another part to identical tasks for most of the frames received such as e.g.:

the consultation of address tables or identifiers in order to recognize the existence thereof and/or deduce therefrom an associated information and/or the task to be performed.

the calculation of the check sum (FCS or check sum, CRC or Cyclic Redundancy Code), operation on various fields, etc.

The object of the invention is an analysis process making it possible to gather together in the same memory all the dynamic or parametrizable informations, the processing of the routing by source, processing in the same apparatus of several protocol levels, as well as for the same level different protocols. It also relates to an apparatus of the fast translator type able to supply in movement the informations necessary for the dispataching of data at high speed or for supplying information elements on the complementary processing operations to be carried out.

SUMMARY OF THE INVENTION

The invention relates to a process for the analysis of all or part of the informations contained in data structures in order to supply to an external system the informations necessary for the routing of said data structures or for their processing by an intelligent external system in which analysis takes place of the significant fields of said data structures, particularly the source or destination addresses, using the principle of translation tables by successive indirections in a two-dimensional array TRIE (i, j), each line of the table constituting a register with 21 cells, in which k is the length of the analyzed bit slice, wherein the search in the translation tables takes place at the clock cycle of the entering information by data structure bit slices, in such a way as to start the search before having completely received the data structure, the content of a cell making it possible, after a time equal to a few data bit slices, to address the following bit slice, or to indicate if the search has failed, or supply an operating information for an intelligent external system, or a value, particularly for routing, associated with the content of the active data structure, wherein the informations are supplied to an associated state machine and wherein the check informations of the protocol and the addressing informations of the protocol are both processed.

In this process, it is possible to carry out several successive analyses, the same table being usable for several search types by using different paths, e.g. by starting the searches by different gate registers.

It is known to exclude from the search all consecutive parts or not of the data structure without alignment constraint of the field or a subpart of the tested part on a bit slice boundary and without interrupting the search process.

In the process according to the invention, data structures containing a routing information can be source routed. The frame routed by the source more particularly described in ISO standard 10038 Add 2 comprises an information routing field constituted by a number of fields, including a RT field indicating the routing type and LTH field indicating the length in bytes of the routing information field, as well as a route designator sequence. The analysis of the RT and LTH fields is obtained by consulting the TRIE memory, which supplies the following informations:

a function for the frames of the ARE or STE type enabling the end systems to produce their own routing tables, an error if the LTH field has an incorrect value, the duration precalculated in segments if the frame is of the SRF type.

The dispatching information is obtained by analysis of the route designator zone describing the path which must be followed by a frame, the path being described by the succession of links taken (LAN identifiers LANid) and nodes traversed (bridge identifiers BN).

The routing path is established by recognizing a particular sequence (LANid, BN, LANid) in the RD field, recognition taking place in the following way:

until a first LAN identifier has been recognized, the bridge identifier is ignored and the search started again, as soon as a LAN identifier has been recognized, the routing path is obtained after analyzing the bridge identifier and the LAN identifier which follow;

the "until" condition being obtained by an adapted programming of the TRIE memory: a failure during the analysis of one of the segments of a LANid bringing about pointing to dummy registers pointing either towards the following dummy register, or for the last towards the gate register in order to start again the search.

The route path, which is dependent on the frame direction, is obtained at the end of the analysis by indirection on the stored intermediate result, when the sequence has been recognized, and by indexing by the direction bit recorded beforehand.

The invention makes it possible to obtain in real time and at the speed of the fastest existing local networks (200 Mbit/s) and using standard technologies or with a time lag by spreading the processing time so as to serve several high speed local networks, informations making it possible to determine data elements linked with the filtering, routing, security, accounting, etc. as well as the verification of certain elements essential for the identification of the processing type to be carried out on a frame (check sum, constraints on different fields, etc.) in hidden time if it is correctly inserted in the system using it.

Therefore it leads a priori to the more or less detailed comprehension of the structure of the frame received. Thus, a more precise determination (before processing by the actual processing unit) makes it possible to direct the frame to the necessary processing function. It is then possible to separate the functions, whose realization is critical from the time standpoint from those which are less so and without penalizing the former.

The invention also relates to an apparatus for the analysis of informations contained in data structures in order to supply to an external system the informations necessary for the routing of said data structures or for their processing by an intelligent external system, characterized in that it comprises a state machine, a RAM memory, a read-write control module making it possible to read or write into the RAM, participate in the RAM-state machine arbitration and optionally parametrize the state machine, different state machine outputs corresponding to intermediate results, to the gate register, to the direction and to the analyzed segment, whilst the address outputs of the read-write module are connected to the RAM across a data path.

Other state machine outputs are connected to a result module, which is partly read into the memory and partly into the state machine and supplies signals corresponding to the value, the analysis type, the error, the presence of values, the presence of a function and the presence of a result. The data accesses of the read-write module and the automaton are connected to the RAM. This apparatus also comprises a check sum verification module.

In a first variant adapted to the IP-DOD protocol, said check sum verification module comprises an adder receiving on eight first inputs the byte to be analyzed, its eight outputs being connected to a first register (A) and to a second register (B), whose respective outputs are connected to the two inputs 0 and 1 of a multiplexer, which has its outputs connected to the second inputs of the adder. The carry output of the adder is connected to the carry output thereof across a third register, which receives a clock $\phi$. The first register (A) receives a clock $\phi$A, the second register (B) and the multiplexer receive a clock $\phi$B.

In a second variant adapted to the ISO-CLNP protocol, this check sum verification module comprises a first adder receiving on its first inputs the byte to be analyzed, the outputs of said adder being inputted onto a first register (Co), whose outputs are delivered to the second inputs of the first adder and to the first inputs of a second adder. The outputs of the second adder are inputted on a second register (C1), whose outputs are connected to the second inputs of the second adder. The carry output of the first adder is connected to the first carry input of the first and second adder across a third register and the carry output of the second adder is connected to the second carry input of said second adder across a fourth register, which receives the same clock $\phi$.

This apparatus can be used in an application to a data structure switch or to a routing bridge having in particular a FDDI interface.

The apparatus according to the invention comprises several parts:

a part distributing the tasks to be performed, each part being minimal by a process which can be likened to a work vectorization, the performance of the most frequent tasks such as the consultation of address tables, FCS and CRC calculation, etc.

Thus, the total apparent processing time is greatly reduced and the power necessary for subsequent tasks is less, each of the latter being more weakly coupled than in the preceding solution.

As a function of the hardware/software compromise adopted and the desired performance characteristics, certain tasks can be performed in the apparatus.

Within the framework of the presently available technology, the apparatus according to the invention is applicable to the economic construction of a packet switch (and more particularly bridges, routers, bridge/routers or router switches) able to process from the power standpoint all the informations transmitted to it including in the case of very high speed local networks (FDDI, ATM, ...) or the WAN network (Wide Area Network) having high speeds (SDH or Synchronous Digital Hierarchy, ATM).

This apparatus has numerous advantages:

It makes use of a search method used in telephony or computer science in the case of packet switches (in particular in the case of bridges, routers and bridge/routers), no matter what their operating modes (connection-less mode, connected mode, other mode, etc.) of a simultaneous or non-simultaneous nature and no matter what the protocols used, the novelty being in the application to said field.

It makes it possible to collect together in the same apparatus most of the critical and/or repetitive analysis functions and also filtering, routing, security, etc. in a synchronous or asynchronous manner with respect to the data flow (including the real time).

It permits the vectorizations of the processing operations to be subsequently carried out.

It makes it possible to rough down the subsequent tasks to be performed by optionally defining them in hidden time during the reception of the data flow.

It makes it possible to produce more economic and higher performance apparatuses, other than of the store and forward type.

BRIEF DESCRIPTION OF THE DRAWINGS

FIG. 1 Shows an example of a TRIE memory.

FIGS. 2a and 2b Respectively show the fields excluded from the search and the wait for a particular value.

FIGS. 9a, 9b, 9c and 9d Illustrate different MAC frame address fields.

FIG. 10 Illustrates an IP-DOD header.

FIG. 11 Illustrates an ISO-CLNP header.

FIGS. 13a and 13b Show a format of the content of the TRIE memory.

DESCRIPTION OF THE PREFERRED EMBODIMENTS

Figure 3A:
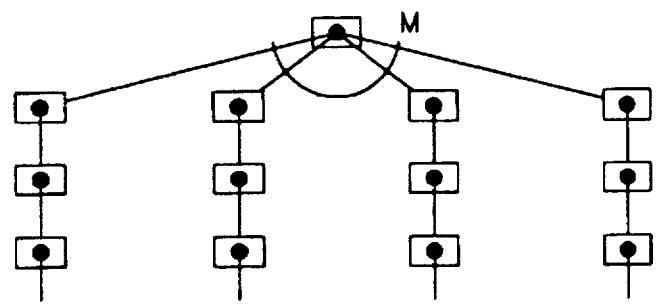
FIGS. 3a, 3b and 3c Illustrate the memory size computation.

With the exception of the content addressable memories, the management or control methods described hereinbefore are not applicable if the aim is to search for an address in approximately 100 ns. The TRIE memory proposed by R. de la Briandais or E. Fredkin at the end of the 1950's constitutes an interesting solution. Memories of this type are described in the articles entitled "trie Memory" by E. Fredkin (Communications of the ACM, vol.3, no.9, September 1960) and VLSI Implementation of routing tables: TRIES and CAMS by Tong-Bi Pei and Charles Zukowsky (10th annual Joint conference of the IEEE Computer and Communication Societies Bal Harbour, Fla., USA, April 1991). The advantages of the TRIE memory are a rapid, constant access time, a bit slice search, the possibility of processing different address lengths and relatively easy updating.

The bit slice search makes it possible to start the process before having completely received the address.

The only disadvantage of the TRIE memory is its relative inefficiency in memory space (but comparable with that of hash coding if a number of comparisons very close to 1 is desired).

The evaluation of the silicon surface between the CAM and TRIE approaches reveals an advantage for the former, but CAM memories do not benefit from all the work carried out on RAM memories or from the same production volumes. Moreover, the TRIE memory is much better adapted to variable length address processing or more generally to the recognition of random patterns.

The search is carried out by successive indirections in a two-dimensional array TRIE (i, j), as shown in FIG. 1. Each line of the array constitutes a "register" of $2_k$ cells (according to the terminology proposed by E. Fredkin), in which K is the tested bit slice length.

The content of a cell makes it possible to address the following register or to indicate by pointing to the first register or gate register if the search has failed. For each slice of K bits $A_1$ of received address, the content of the TRIE ($A_1$,p) cell supplies the address of the following register p'. The final reading, if it is not zero, supplies the information associated with the active address.

The analysis depth can be variable and can be indicated in the actual table if the content of the cell includes a supplementary bit signifying that the result has been obtained.

The same table can be used for several search types simply by starting the search by different gate registers. The memory and the search process remain identical for different protocols and address types, as does the table updating procedure.

FIG. 1 shows a TRIE memory in which are stored the following addresses and associated informations:

| | |
|---|---|
| 4096 | Tel. (Telephone) |
| 6531 | Fax (Telefax) |
| 6517 | Fax (Telefax) |
| 39 46 97 77 | xxx (other) |

A complete segment (or a field in a segment) can be excluded from the search (don't care). FIG. 2a gives an example of the content of the memory in the case of two bit segments in which it is wished to recognize the pattern: -1x-x1-xx-10.

The search can only start or resume after the recognition of a particular value, e.g. -11-01- in FIG. 2b.

Figure 3B:
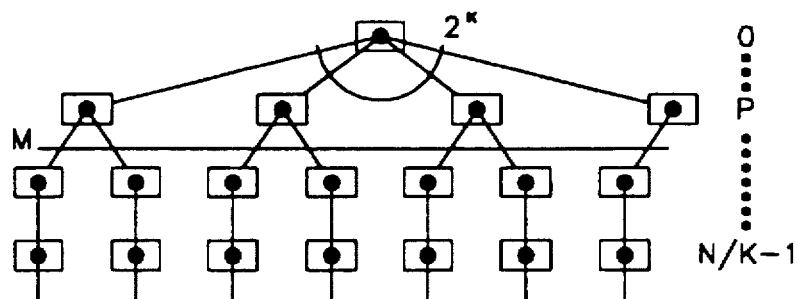
Figure 3C:
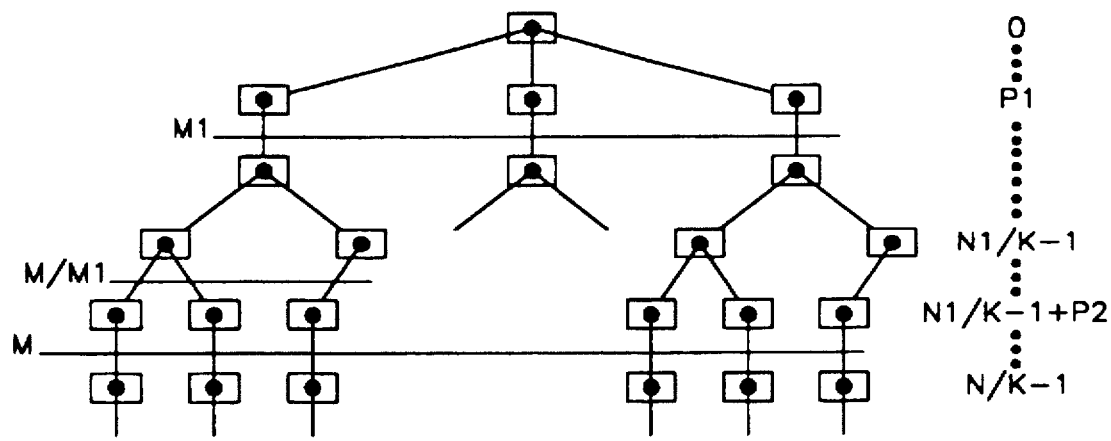

FIGS. 3a, 3b and 3c illustrate the dimensions of the memory, namely:

FIG. 3a: the worse case when $M<2^K$;

FIG. 3b: the worse case when $M>2^K$;

FIG. 3c: the publicly administered MAC addresses.

The common high order fields are only stored once. The worse case is encountered when the stored addresses have no field in common as from the high order (FIG. 3a). M is the total number of addresses to be stored, N the address length and K the bit slice length.

An address occupies N/K registers. The first (the gate register) is common to all the addresses. In the worse case the total number R of registers is $R=1+M\cdot(N/K-1)$. The number C of cells per register is $C=2^K$. The content of a cell must be able to address all the registers. Therefore the length of the word is the integer B such that: $B \geq Log_2 R$.

For example, the storage of 10,000 addresses 802.x of 48 bits requires in this worse case hypothesis a memory of:

940·10³ words of 19 bits for 1bit slices;
920·10³ words of 18 bits for 2bit slices;
1.76·10³ words of 17 bits for 4bit slices;
12.8·10³ words of 16 bits for 8bit slices.

P is the integer such that $2^{PK} \leq 2^{(P+1)K}$ or:

$$P = \text{integral part} \left[ \frac{\log_2 M}{k} \right]$$

In the worst case, if M is higher than $2^K, 2^{2K}$, etc. the registers of the levels 0 to P are in a number Lower than M (FIG. 3b). Therefore a less pessimistic value of the worse case can be written:

$$R = \sum_{i=0}^{i=P} 2^{i \cdot k} + M \left[ \frac{N}{K} - P - 1 \right]$$

or $$R = \frac{2^{k(p+1)} - 1}{2^k - 1} + M \left[ \frac{N}{K} - P - 1 \right]$$

According to this less approximate hypothesis, the memory volume necessary for the storage of 10000 MAC addresses is reduced to:

| | |
|---|---|
| 0.348 | 10⁶ words for 1 bit segments |
| 0.725 | 10⁶ words for 2 bit segments |
| 1.5 | 10⁶ words for 4 bit segments |
| 10.3 | 10⁶ words for 8 bit segments |

The number of storable addresses can be much greater. For example, the 902.x address of 48 "openly managed" bits comprise an identifier of the address type and of the manufacturer type (IBM, DEC, HP, ...), in their 24 most significant bits. The number of different identifiers in all the active addresses at a given time is reduced and the necessary memory volume is further reduced. FIG. 2c shows this case in the most unfavorable hypothesis where the M addresses to be stored are uniformly distributed between M1different identifiers of length N1 bits in the high order address fields. P1 and P2 are integers such that:

$$P_1 = \text{integral part} \left[ \frac{Log_2 M_1}{K} \right]$$

$$P_2 = \text{integral part} \left[ \frac{Log_2 \frac{M}{M_1}}{K} \right]$$

The number of registers required becomes:

$$R = \frac{2^{k(p2+1)}-1}{2^k - 1} + M_1 \left[ \frac{N_1}{K} - P_1 - 1 \right] +$$

-continued $$M_1 \left\{ \frac{2^{k(p2+1)-1}}{2^k - 1} + \frac{M}{M_1} \left[ \frac{N - N_2}{K} - P_{2-1} \right] \right\}$$

In the case where the number of identifiers is limited to 20, the storage of 10000 MAC addresses is reduced to 0.551 10⁶ words for a 4bit segment width.

Thus, the necessary speed and the performance characteristics of the memory are also involved in the choice of the width of the processed address segment with Tcy being the time of the TRIE memory reading cycle and D the bit rate at which the address to be analyzed arrives.

Figure 4A:
FIGS. 4a, 4b and 4c Illustrate the translation time.
Figure 4B:

FIG. 4 illustrates the translation time, namely:

FIG. 4a: address to be analyzed,

FIG. 4b: memory cycle longer than the address bit slice

Figure 4C:
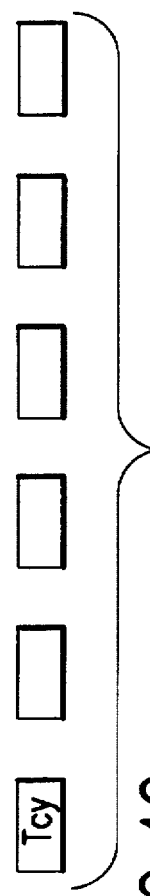

FIG. 4c: memory cycle shorter than the address bit slice.

Translation requires at the most N/K cycles. It can only start after receiving the first segment and can only finish one cycle after the reception of the last segment, as shown in FIG. 4. Therefore the analysis time Tan is:

Tan=K/D+max[(N/K-1)Tcy, (N-K)/D]+Tcy

The access time Tac between the arrival of the last bit of the address to be analyzed and the result is deduced:

Tac=Tcy if

Tcy≦N/K/D

Tac=(N/K)·Tcy−(N−K)D if

Tcy>N/K/D

The second case (FIG. 4c) is the most favorable from the speed and simplicity terms. It is not necessary to store intermediate segments or to carry out a speed change. Under these conditions, with the existing performance characteristics of fast static RAM memories (access time of 20 to 30 ns), a cycle time of 40 ns and 4 bit address segments represent a good compromise for processing 100 Mbit/s.

Consideration will now be given to an application to a FDDI routing bridge. The use of a memory organization of the TRIE type associated with a wired logic makes it possible to calculate "on the fly" the informations necessary for the routing of a network level or MAC level frame or, if the frame cannot be directly routed, facilitate the processing operations to be carried out by the routing bridge processor.

A FDDI MAC level according to standard ISO 9313 was chosen as an example for the following reasons:

the speed is high (100 Mbit/s) making it difficult to implement software methods, the processing operations to be performed at the MAC level (bridge) or network level (router) are known.

The description of the operations to be performed and the way in which the problems have been solved clearly has a more general scope and other applications can be envisaged such as:

the translation of VP/VC identifiers in ATM switches, the translation of DLCI connection identifiers in frame relay switches, the processing of other MAC level protocols (CLNAP,(CCITT 1.364),IEEE, 802.6 ...)

network level or even transport level protocols, call charging or traffic observations, etc.

FDDI MAC Heading

Figure 5A:
FIGS. 5a, 5b, 5c, 5d and 5e and 6a and 6b Illustrate the different FDDI frame address fields.

FIG. 5a shows the start of a FDDI frame. The analysis starts on the SD (Start Delimiter) frame start delimiter formed by the pair of symbols JK. The bits of format FF of the Frame Control (FC) byte indicate the format of the "void", token, SMT frame at the LLC or MAC level. Only the frames of the LLC (FF=Ol) can be routed.

The bit L indicates the length of the source and destination addresses which follow: 16 bits if it is at 0 and 48 bits if it is at 1. A different gate register is chosen as a function of its value. The analysis of these three fields is wired.

The recognized MAC addresses are indicated by a "match" signal to the apparatuses controlling the MAC level on the FDDI ring in order to be able to withdraw from circulation the corresponding frames. The translator appears thereto as a large capacity content addressable memory. It is possible to prevent the forwarding of a frame whose source or destination address has been marked as forbidden.

Certain MAC destination addresses have a particular meaning and do not imply the routing of the frame, but instead its processing by the bridge processor.

Figure 5B:

FIG. 5b illustrates a functional MAC address. A list of these addresses is given in the work entitled "Assigned numbers" by J. Reynolds and J. Postel (RFC 1060, March 1990). Reference can be made to the following "well known" MAC addresses:

| | |
|---|---|
| -09-00-2B-00-00-03 | for "End System Hello"; |
| -09-00-2B-00-00-04 | for "Intermediate System Hellow"' |
| -01-80-C2-00-00-00 | for setting up and updating a jamming tree covering all the bridges. |

These addresses implying a processing by the processor of the bridge router either because the information contained in the frame is directly addressed to it, or because more complex processings are necessary before the dispatching of the bridge will subsequently be referred to as "functional addresses".

The recognition of its address by the bridge after destination address analysis leads to a subsequent analysis of the information field which can e.g. contain an IP-DoD or ISO-CLNP (Connectionless Network Protocol) packet. The routing information or the indication of a particular processing to be carried out by the processor of the bridge router can consequently only be supplied after the successive analysis of headers (LLC, then SNAP, ISO CLNP, IP, . . . ) in the information field.

Figure 5C:
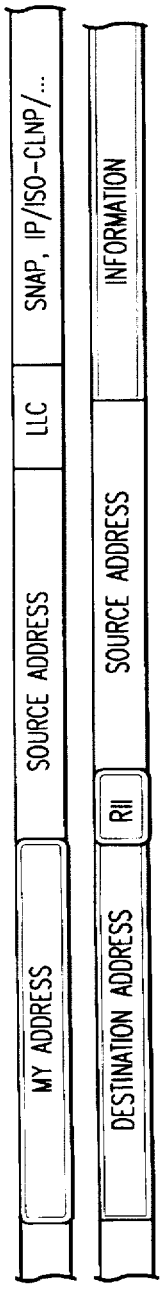

FIG. 5c illustrates the analysis of the destination address and the source routing indicator. The first bit of the source address (RII) indicates when it is at 1 the presence of a Routing Information (RI) field for the Source Routing in the information zone following the destination address. Therefore the dispatching information can only be supplied after the analysis of the routing information, which Immediately follows the source MAC address.

Transparent Bridge or Routing by Spanning Tree

Figure 5D:

FIG. 5d illustrates a transparent bridge.

If none of the two aforementioned cases is encountered, the dispatching is supplied by the information associated with the MAC destination address, if present. The first two bits of the destination address indicate the address type: individual or group (I/G), locally or universally administered (U/L). They are analyzed by the TRIE memory like the remainder of the address. Routing takes place on a spanning tree if the address has not been found.

Bridge with Routing by the Source

Figure 5E:
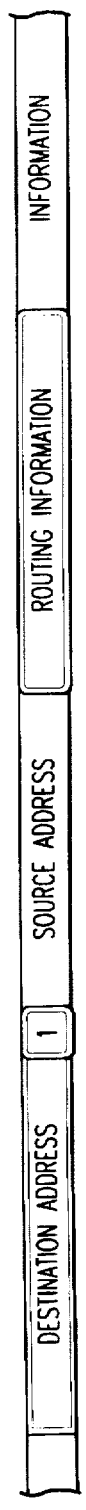

FIG. 5e illustrates a frame routed by the source.

Figure 6A:

FIG. 6a illustrates the Routing Information field. The Routing Information field of FIG. 6a is constituted by the fields RT, LTH, D and LF and a sequence of route designators.

RT indicates the routing type. Only frames of the Specifically Routed Frame type (SRF, RT=Oxx) have a routing indicated in the route designator zone. The other types (All Route Explorer ARE and Spanning Tree Explorer STE) are used by the end systems for producing their own routing tables. These frames are to be processed by the bridge processor.

LTH indicates the length in bytes of the information routing field (i.e. 2 plus the length of the route designator zone).

D indicates the direction of the frame: D=0 for a frame of the origin to the end and 0 in the reverse direction, e.g. for a response of the end which has no routing calculation to carry out, but simply inverts said bit.

The analysis of the Ri field in the source MAC address is wired and this is one of the events recognized by the linking automaton for the different analysis types.

The analysis of the RT and LTH fields is obtained by consulting the TRIE memory which supplies the following informations:

a function for frames of the ARE or STE type, an error if the LTH field has an incorrect value, the precalculated duration in half-bytes if the frame is of the SRF type.

The content of the gate register and the other registers which follow for the analysis of the RI field is established on initializing the TRIE memory. The routing path information is obtained by the analysis of the route designator zone, which describes the field which must be followed by a frame of the SRF type.

Figure 6B:
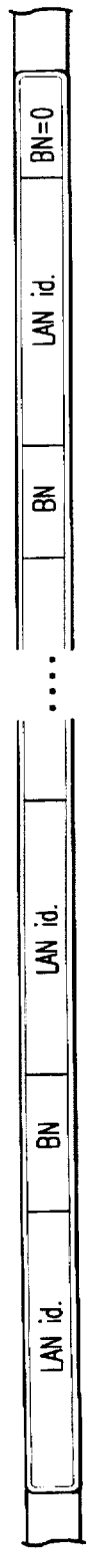

FIG. 6b illustrates an example of route designators. The path is described by the succession of links taken (LAN identifiers, LANid) and the traversed nodes (bridge identifiers, BN). The significance of the bridge number can depend on the pair of LAN identifiers (Local Area Network or RLE) framing it. The final bridge identifier is fixed at 0 and is there for aligning the Route Designator zone on a byte boundary.

Figure 7:
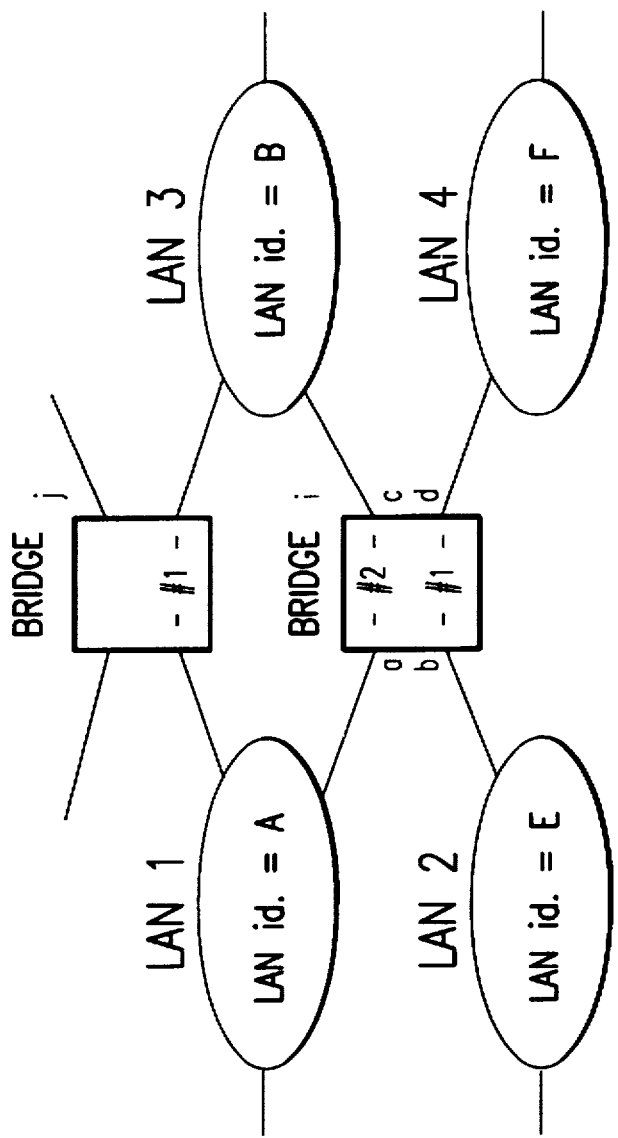
FIG. 7 Shows a network example.

FIG. 7 shows a network example in which the frames are to be dispatched in routing by the source. Thus, a frame is exchanged between the local networks LAN 1 and LAN 3 through the bridge i:

the field RD is not dependent on the exchange direction, a particular LAN identifier can only appear once, only the frames in which (A, #2, B) appear are to be routed by the bridge i, when D=0 the bridge i dispatches the frames (A, #2, B) on its port c, when D=1, the bridge i dispatches the frames (A, #2, B) on its port a.

Dispatching is established by the recognition of a particular sequence (LANid, BN, LANid) in the field RD, e.g. in the above case the sequence (E, 1, F) by the bridge i.

Recognition takes place in the following way:

until a first LAN identifier has been recognized, it is necessary to ignore the bridge identifier and recommence the search.

as soon as a LAN identifier has been recognized, dispatching is obtained after analysis of the bridge identifier and LAN identifier which follow.

Figure 8:
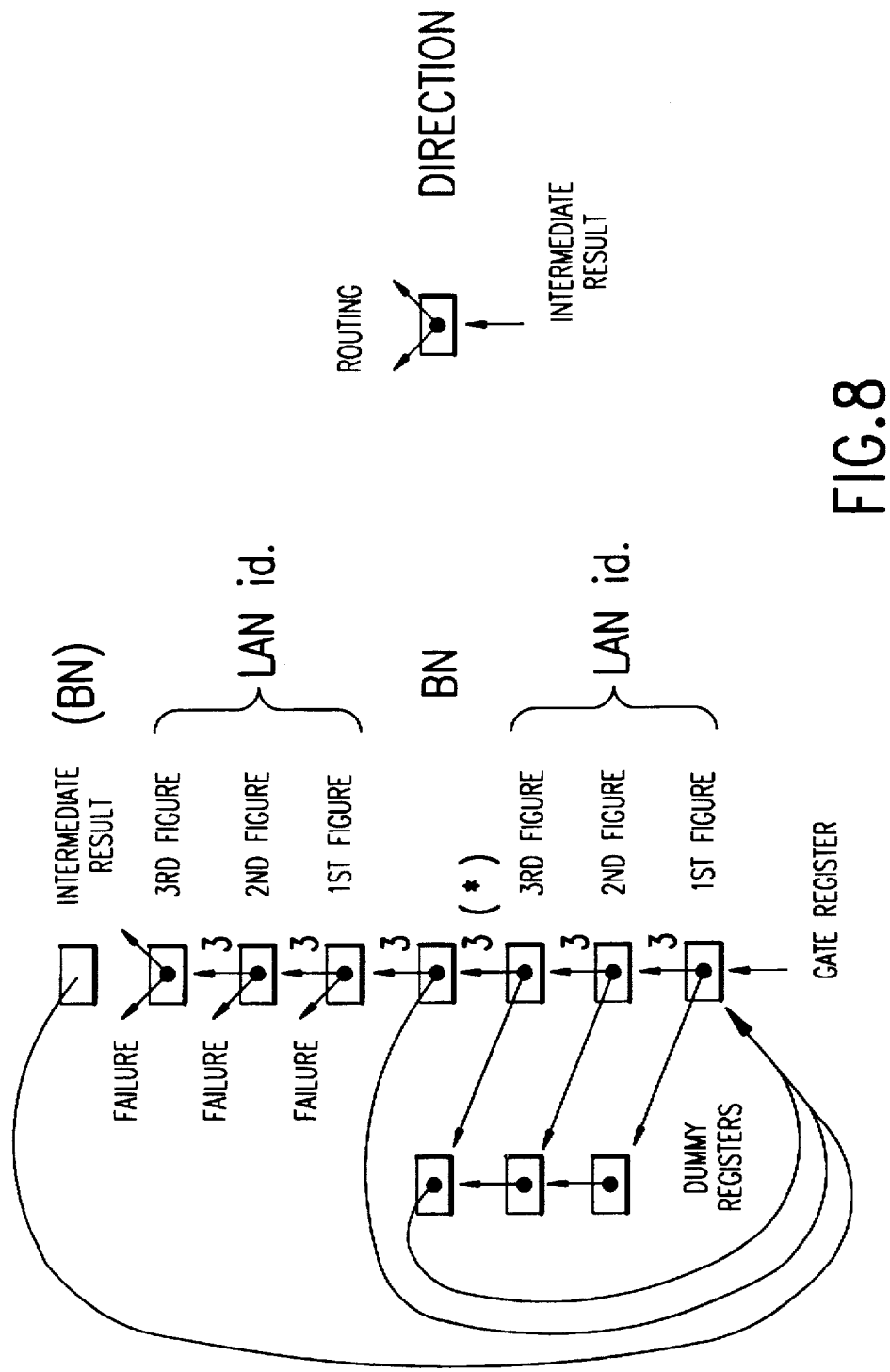
FIG. 8 Illustrates a search in the case routing by source.

The "until" condition is obtained by an adapted programming of the TRIE memory. A failure during the analysis of one of the segments of a LANid points to the dummy registers pointing either towards the following dummy register, or for the last (read at the same time as the following bridge identifier) towards the gate register in order to recommence the search. The pointers to the dummy registers are of a particular type. FIG. 8 shows the path covered in the memory during a sequence search in the case of routing by the source. The content and position of the dummy registers are established during the memory initialization phase. In FIG. 8, the symbol ∃ translates the existence of a pointer.

The dispatching is dependent on the direction of the frame and is obtained at the end of the analysis by indirection on the stored intermediate result when the sequence has been recognized and indirection by the direction bit recorded beforehand.

The same LAN identifier in a LANid, BN, LANid sequence traversing the same must not occur more than once in the sequence of route designators. If the frame is not eliminated in this case, the bridge will loop and multiply in the network. The process according to the invention does not make it possible to recognize a multiple occurrence of the same identifier, but the appearance of more than two LAN identifiers connected to the bridge in a route passing through it. This condition includes the preceding condition and also makes it possible to reveal routes which are not of an optimum nature. Such a case can occur if the network changes configuration by the addition of a LAN to the bridge when the source has not been notified of this.

In order to do this, the sequence of route designators is entirely examined and the number of passages in the edge designated by (*) in FIG. 8 is counted. If the latter is > at 2, the route loops or is not optimum.

The bridge recognizes a failure condition if the routing path is nonexistent after the recognition of a sequence LANid, BN. This case can occur if the network changes configuration by withdrawing a LAN when the source has not been notified thereof.

MAC Frames Addressed to the Bridge Router

The processing to be carried out will not be known until analysis has taken place of the LLC (Logical Link Control) field and in the case of IP-DoD or ISO-CLNP frames of part of their header. This variable length and depth analysis makes it possible to obtain information on a network level protocol implemented in the translator, a protocol to be processed by the processor of the routing bridge or information exchange TEST and XID frames in the data link level.

FIG. 9a illustrates an unknown LLC or which is to be processed by the routing bridge processor.

FIG. 9b illustrates the identification of an ARP frame to be processed by the routing bridge processor.

FIG. 9c illustrates an identification of an IP-DoD frame.

FIG. 9d illustrates an identification of an ISO-CLNP frame.

The consultation of the TRIE memory can supply, as a function of the recognized byte succession:

the indication of an unknown value, the indication of the processing to be carried out by the routing bridge processor, e.g. after recognizing a XID or TEST frame signifying that the information which follows is intended for the control of the LLC sublayer (FIG. 9a) or LLC, SNAP=AA-AA-03-00-00-00-08-06 signifying that the information which follows is of the ARP type (FIG. 9b), the indication of the protocol to be processed subsequently, in particular network level protocols such as IP-DOD or ISO CLNP, the length expressed in slices of network addresses if same is determined solely by the recognized protocol type.

The IP-DoD protocol is recognized on the basis of the sequence AAAA-03-00-00-00-80-00-45 (FIG. 9c). The eight first bytes contain LLC and SNAP, the latter belonging to the network level, indicating the version (4) and the length of the IP IHL heading (20 bytes). A value higher than 5 with respect to the length means that the heading contains options which can only be processed by the bridge router processor.

The ISO-CLNP protocol is recognized on the basis of the sequence FEFE-03-81. The first three bytes contain the LLC and the last belongs to the network level, i.e. the NLPID network layer protocol identifier (FIG. 9d).

These sequences are entered in the TRIE memory, their length is variable and it is even conceivable to identify the same network level protocol in several ways, e.g. IP-DoD following LLC, SNAP or LLC, NLPID.

IP-DOD Protocol

FIG. 10 illustrates a DoD header. The processed version is version 4 without options. The recognition of the frames having exceeded their life is wired (test of the Time to Live field TTL=0). It is possible to prevent the forwarding of a frame, whose source or destination address has been indicated as forbidden.

The recognition of particular addresses can imply a processing by the bridge router processor either because the information contained in the frame is directly addressed to it, or because more complex processing operations are required prior to the dispatching of the frame, in the same way as for MAC addresses.

ISO-CLNP Protocol

FIG. 11 illustrates an ISO-CLNP header. The processing operations to be carried out are similar to the preceding case, with the exception of the recognition of addresses, which can have any indicated in the two fields L(DA), L(SA) prefixing the source and destination addresses.

Linking the Different Analysis Types

Figure 12A:
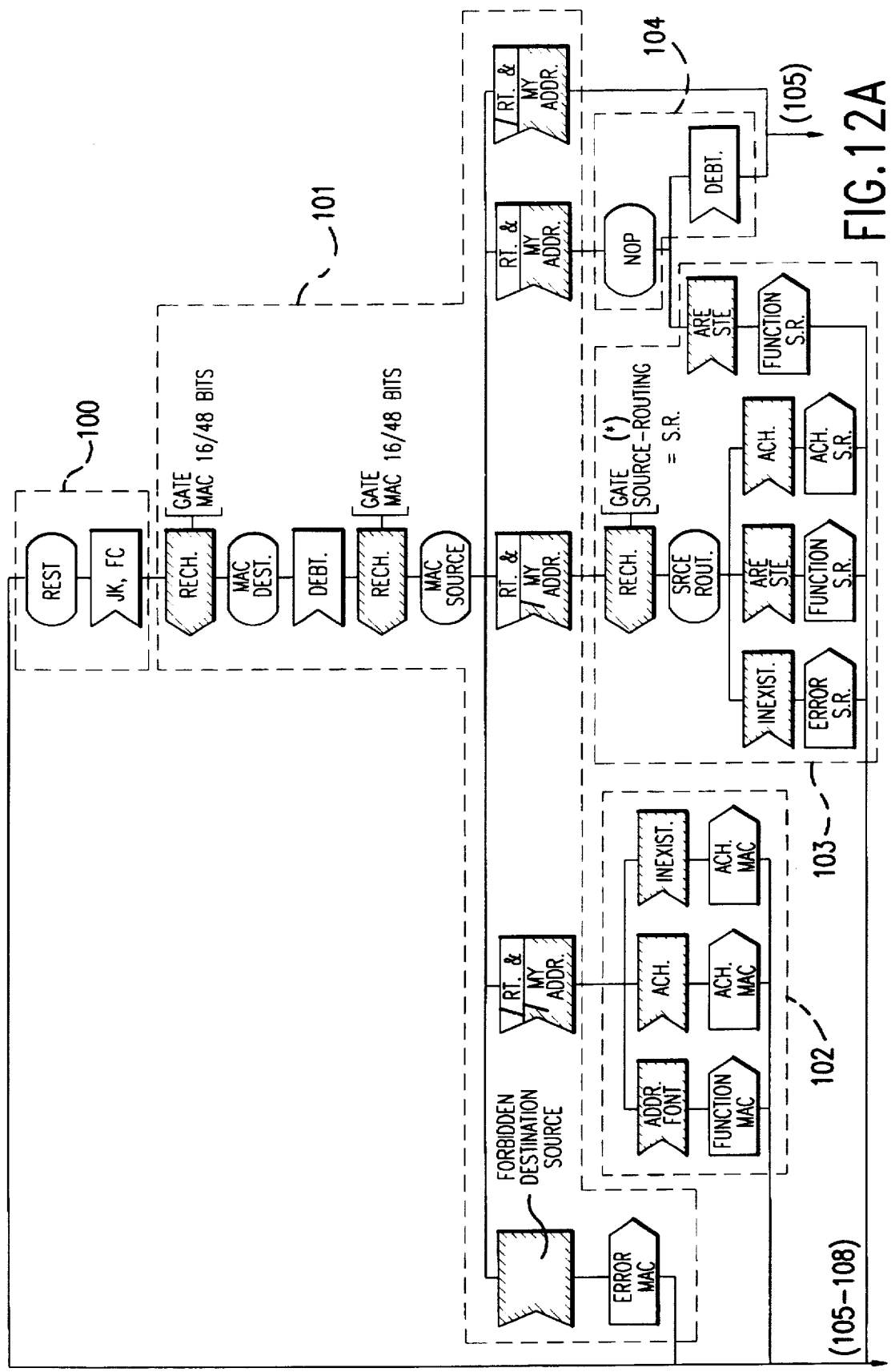
FIGS. 12a and 12b Illustrate an analysis state machine.
Figure 12B:
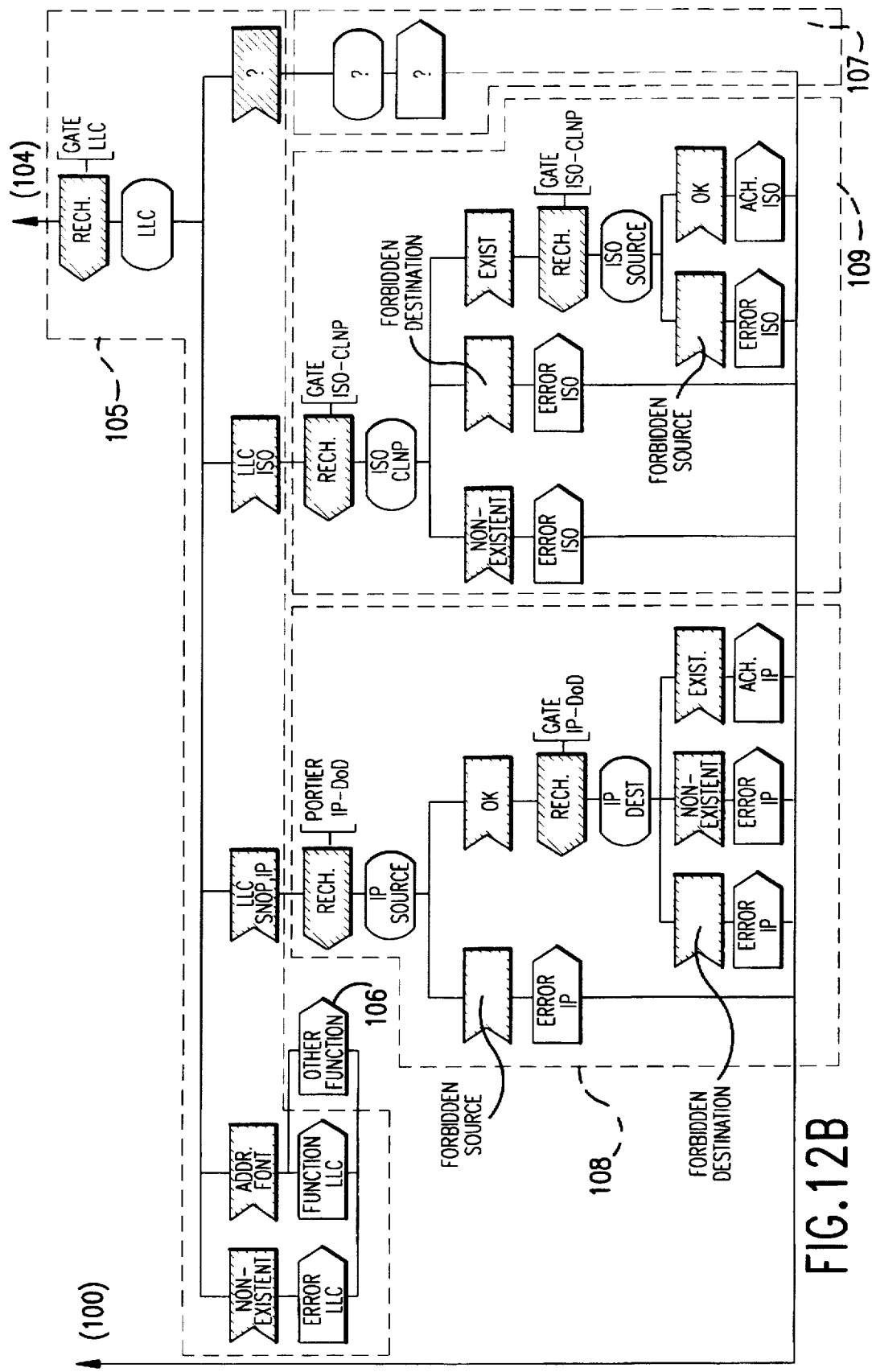

FIG. 12 shows the state diagram of the state machine obtained and which can be broken into the following different blocks:

initialization block 100,

MAC level analysis block 101, without source routing MAC analysis block 102 excluding source routing, source routing analysis block 103, source routing analysis block 104, the bridge being addressed as terminal equipment, LLC analysis block 105, the bridge being addressed as terminal equipment, block 106 entry point for protocol which can only be partly processed, block 107 protocol X e.g. XNS, IPX (the ? referring to other processed protocols, so that there can be several supplementary protocols).

IP-DOD analysis block 108.

IP ISO or CLNP analysis block 109.

It is pointed out that the layer represented by the blocks 101, 102 can be replaced by one or more other layers or can itself be broken down into several layers.

The "Debt" event is the overflow of a time-out, which is triggered in order to limit the search time or identify particular fields of the entering frame. Its value is either wired, or deduced from informations received such as the LTH length in routing indications by the source or the length of addresses of ISO-CLNP frames.

The "error" event interrupts in all cases the analysis taking place and can result from:

an unsatisfactory operation at the physical level when an invalid symbol appears, an incorrect value of a field (e.g. the address length in an ISO-CLNP heading), an address recognized as being forbidden (except for MAC addresses), the detection of an incoherence in the consultation of the TRIE memory (no result having been found before the end of time-out).

The exchanges with the TRIE memory are illustrated by hatching.

The type and result of the analysis are indicated to the switch or processor of the routine bridge during the return to the inoperative state.

The following abbreviations are used in FIG. 12:

/: negation

&: logic AND

RI: presence of the routing indicator by the source

SR: (Source Routing)

OK: source address authorized or not found

Rech.: initialization of search in TRIE memory

Ach. routing path has been recognized

Addr.fcnt: functional address recognized

?: possible extension to other network protocols (*): two gate registers are used for routing by the source.

The analysis types and operations performed are as follows:

*MAC Analysis

The source and destination addresses of length 16 (gate register 1) or 48 bits (gate register 2) are translated into routing path, value or functional address, value. When the destination address has not been recognized, a routing path value by default is supplied corresponding to a spanning tree.

A frame addressed to the bridge causes the translation of the LLC and optionally the following fields if it is not routed by the source or is not of the all route explorer (ARE) or Spanning Tree Explorer (STE) type.

The following errors are detected:

appearance of an invalid symbol during analysis, incoherent memory, forbidden source address, forbidden destination address.

*Source Routing

The routing type field analysis makes it possible to supply the following informations for the frames whereof neither the source MAC address, nor the destination MAC address are forbidden and which are not addressed to the bridge:

function to be processed by the bridge router processor if the frame is of the ARE or STE type, or routing path after translation by the TRIE memory (gate register 2 of the route designator sequence if the frame is of the SRF type and if it is not addressed to the bridge.

The following errors are detected:

non-existent routing path for a SRF-type frame, looped or duplicated LAN identifier, appearance of an invalid symbol during analysis, incorrect value of the LTH field (odd, strictly below 6 for a SRF frame or strictly below 2 for the ARE/STE frames.

*LLC Analysis

The translation by the TRIE memory of the LLC (and optionally part of the following fields) (gate register 3) of the frames addressed to the bridge, whose source address is not forbidden and which are not of the ARE or STE type makes it possible to supply the following information:

the following analysis to be carried out if the translation of the LLC and part of the header of the network layer has made it possible to recognize an implemented network level protocol, or a function to be processed by the routing bridge processor after recognition of a particular LLC or an LLC and part of the informations following it.

The following errors are detected:

appearance of an invalid symbol during analysis, incoherent memory, unknown value of the LLC field or informations following it.

The wiring of other network level protocols is possible following the translation of the LLC in the TRIE memory.

IP-DoD Analysis

The translated headers are those of version 4 without options (IHL=5). A heading length strictly below 5 32bit words corresponds to an error, detected during the preceding analysis (LLC), as well as a value strictly exceeding 5, which requires a processing by the routing bridge processor.

The 32bit long source and destination addresses (gate register 4) are translated into:

routing path value, functional address value,

The following errors are detected:

appearance of an invalid symbol during analysis, incoherent memory, unknown destination address, forbidden source address, forbidden destination address, frame which has exceeded its life, incorrect check sum.

*ISO-CLNP Analysis

The translated headers are those whose network layer protocol is active (NLPID=81). The other values correspond either to an error or e.g. to ES-IS or IS—IS protocols. The processing to be carried out by the bridge router processor is in this case determined during the preceding analysis (LLC).

The source and destination addresses (gate register 4) are translated to routing path, value or functional address, value.

The ISO address header is the AFI (Authority and Format Indicator) field. This field is analyzed by the TRIE memory, like the remainder of the address. All the intermediate registers reached following the translation of AFI can be seen as a group of supplementary gate registers, or which already exist in the case of 48bit MAC or IP-DoD addresses.

The following errors are detected:

appearance of an invalid symbol during analysis, incoherent memory, unknown destination address, forbidden source address, forbidden destination address, frame which has exceeded its life-incorrect address length value (length strictly below 2 or strictly above 32 bytes), header length strictly below 16.

Coding the TRIE Memory Content

The TRIE memory is written by the routing bridge processor and is read by the latter, but in particular by the wired part of the translator. The reading address is obtained by concatenation:

- of a slice (indexing) of the entering frame or a value stored beforehand (e.g. the direction bit of a frame routed by the source) which will address a cell in a register,
- of what has been read into a cell during the preceding cycle (indirection) or initializing the search for a gate register value for addressing a register or an intermediate result stored beforehand.

For information purposes, the following gate registers can be wired:

1 for 16bit MAC addresses, 2 for 48bit MAC addresses, 3 for source routing RT and LTH fields, 4 for the route designator sequence for source routing, 5 for LLC, 6 for IP-DoD addresses, 7 for ISO addresses.

FIG. 13a illustrates the format of the content of the TRIE memory by presenting six most significant bit coding possibilities.

Reading must supply the following informations for each cycle:

- the search continues with the following segment, the content of the cell is a register value on 1 8 bits,
- the following register is a dummy register (extension),
- a result has been obtained,
- the result is a pointer (intermediate result for source routing),
- the search has failed,
- the result is a routing path with two authorization attributes as a function of whether it is a destination or source address,
- the result is a function to be processed by the bridge router processor (recognition of a functional address),
- the result is an intermediate address, its value indicating the next processing operation to be performed (e.g. IP-DoD or ISO-CLNP),
- a time-out associated with the segment-expressed intermediate result.

The content is always placed in the low orders and the indication of its type in the high orders.

Figure 13B:
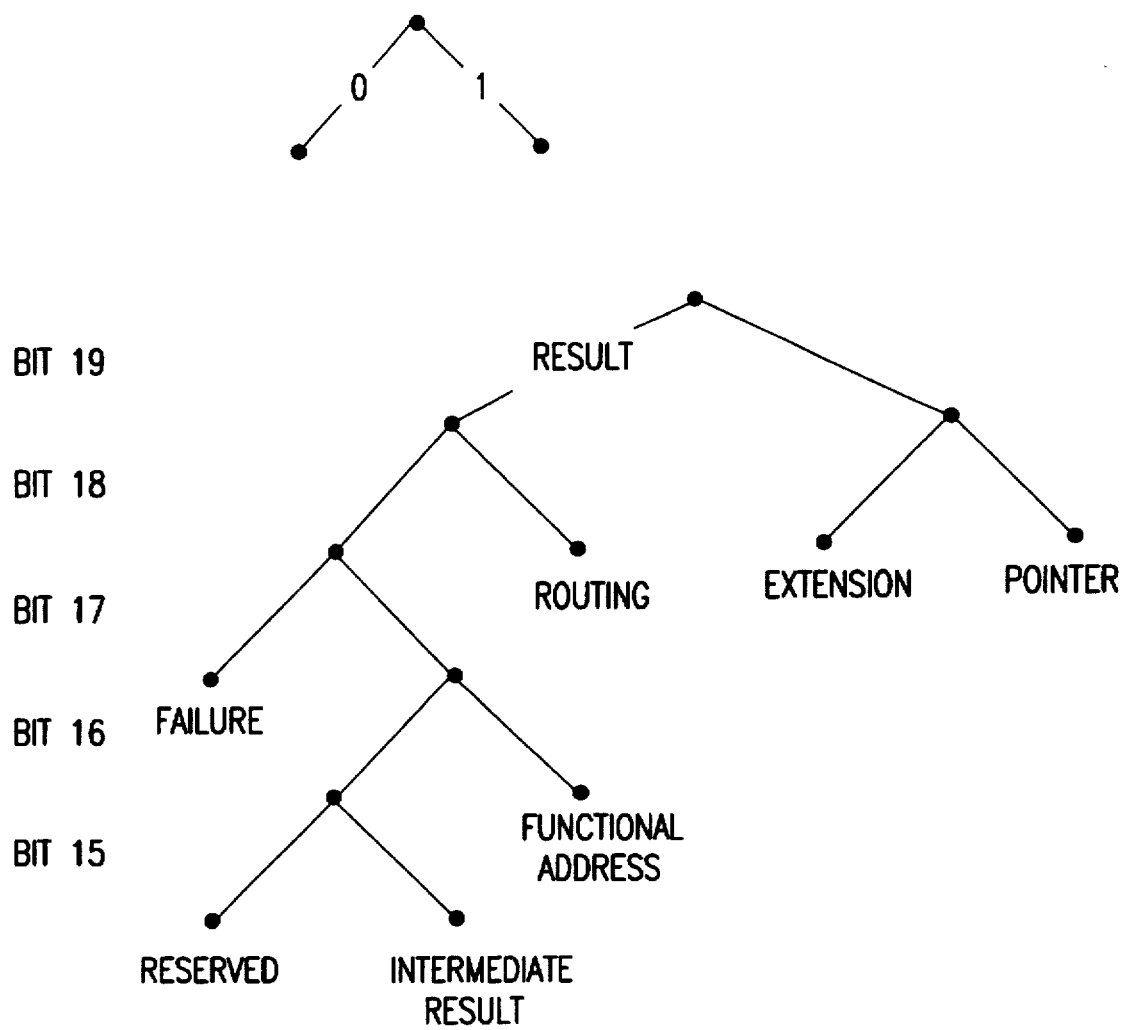

FIG. 13a represents the format of the words and FIG. 13b the tree structure on the type indication bits permitting the maximization of the length of the result for the routing, the indirection or the indirection with extension and the minimization of the number of bits to be processed for knowing the type of operation to be performed.

The arrangement of the tree shown in FIG. 13b could obviously differ.

With a word length of 20 bits, the addressing capacity is $2^{18}$ registers and the memory volume can therefore reach 4M permitting the storage of more than 23000 48bit MAC addresses, obviously other values could be used.

Verification of the Check Sums

The network level headings (IP-DoD or ISO CLNP) have a check sum field in order to detect if they are subject to errors. The verification task takes up a considerable amount of time for the bridge processors. It is a simple task which can be wired.

Figure 14A:
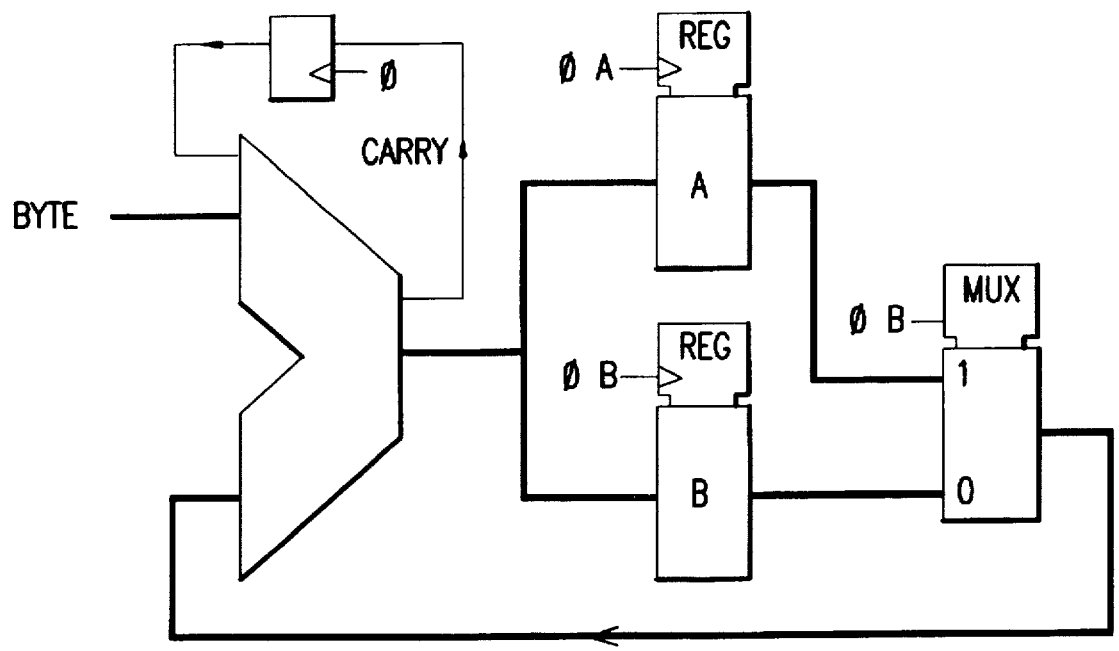
FIGS. 14a, 14b and 14c Illustrate a calculation of the check sums.
Figure 14C:
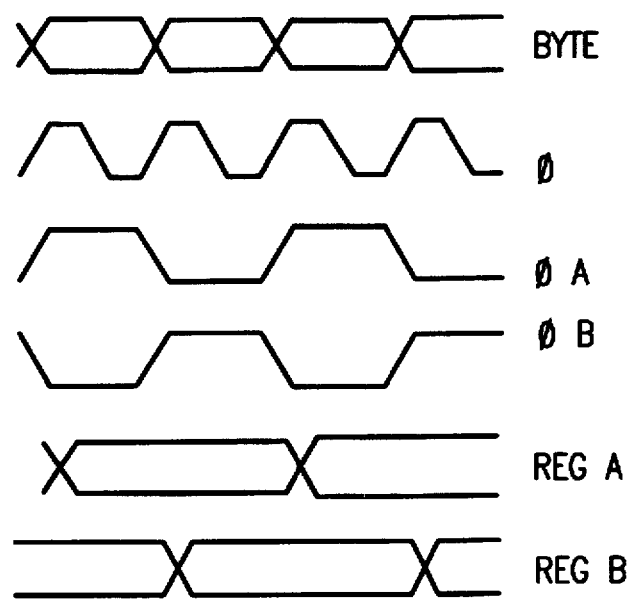
Figure 14B:
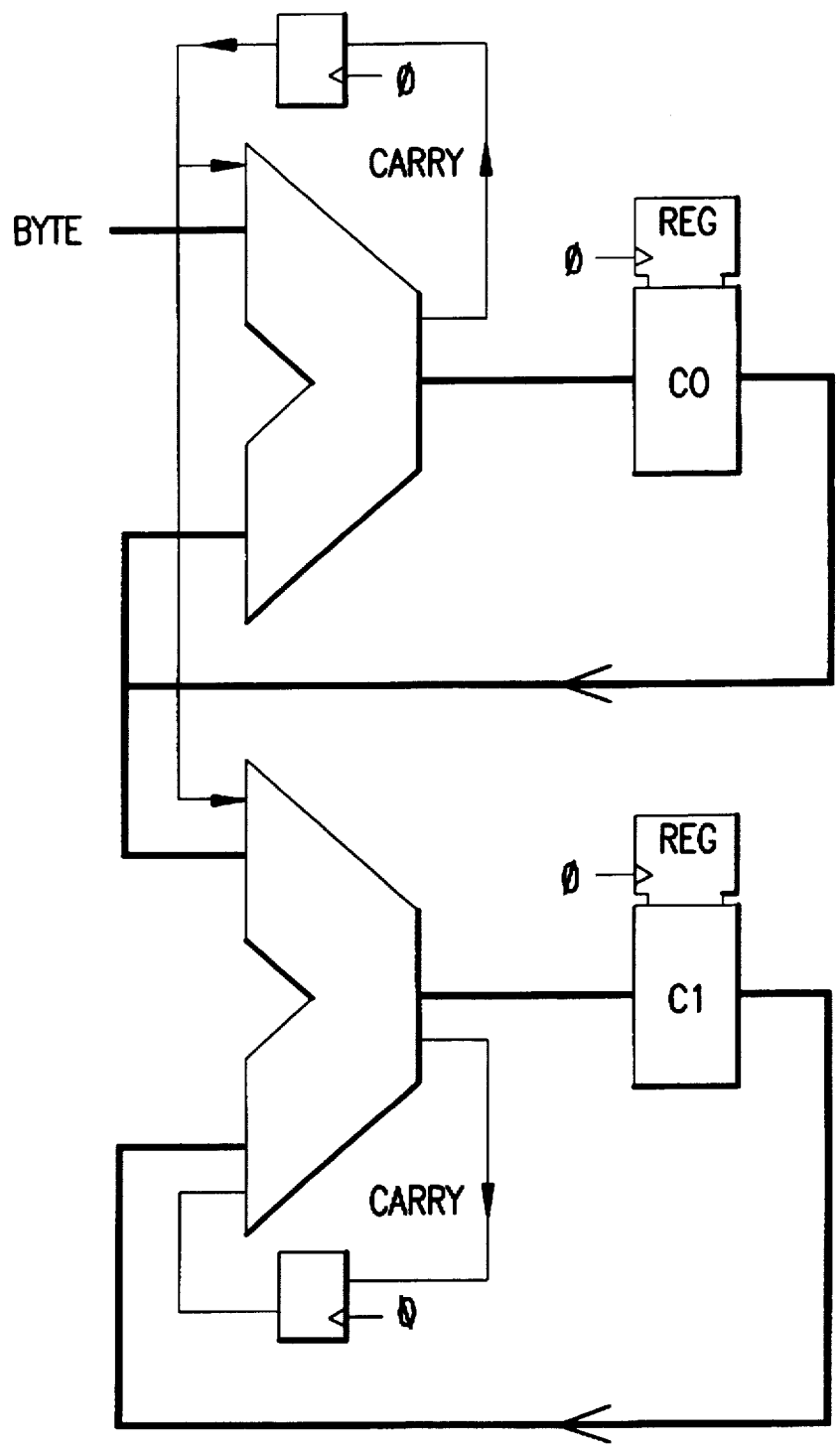

FIG. 14 illustrates the calculation of the check sums:

FIG. 14a: in the case of the FCS IP-DOD calculation,

FIG. 14b: in the case of the FCS ISO CLNP calculation,

FIG. 14c: the timing diagrams.

In FIG. 14a an adder receives on eight first inputs the byte to be analyzed. The eight outputs are connected to a first register A and to a second register B, whose respective outputs are connected to two inputs 0 and 1 of a multiplexer, whose outputs are connected to the second inputs of the adder. The carry output of the adder is connected to the carry input thereof across a third register receiving a clock $\phi$. The first register A receives a clock $\phi A$, the second register B and the multiplexer receiving a clock $\phi B$. The multiplexer is such that when $\phi B=0$, the signals present on the inputs 0 occur at the output and when $\phi B=1$, the signals present on the inputs 1 occur at the output.

In FIG. 14b, a first adder receives on its first inputs the byte to be analyzed. The outputs of this adder are inputted onto a first register Co, whose outputs are delivered to the second inputs of the first adder and to the first inputs of a second adder. The outputs of the second adder are inputted to a second register C1, whose outputs are connected to the second inputs of the second adder.

The carry output of the first adder is connected to the first carry input of the first and second adders across a third register. The carry output of the second adder is connected to the second carry input of the same across a fourth register. The four registers receive the same clock $\phi$.

*IP-DOD Check Sum

The check sum field is obtained by the inversion of the bits of the result on 16 bits of the $2^{16}-1$ modulo sum of all the 16bit words of the heading.

Checking takes place by adding modulo $2^{16}-1$ every 16bit word of the header (including the check sum). The result of this addition must be FFFF in hexadecimal if there is no error.

Addition can take place bytewise without taking account of their order (high order byte or low order byte in header) or their representation (high order bit or low order bit in header). It is merely necessary to propagate the carry towards the following accumulator register.

FIG. 14a shows the architecture of the accumulator. Phi is the byte clock and PhiA and PhiB are the shifted clocks of two 8bit registers, each containing half the check sum. The content of each register is alteratively presented at the input of the adder at the same time as the new byte received. The carry is looped back onto the adder:

- at the first 16bit half-word, i.e. a normal carry of low order to high order,
- at the second half-word, i.e. a carry of high order to low order of the following word in order to carry out the modulo $2^{16}-1$ addition.

*ISO-CLNP Check Sum

The check sum field is again 16 bits, but its calculation and verification are different: two bytes $C_0$, $C_1$, are calculated for each header byte in modulo $2^8-1$ arithmetic (an ISO CLNP header not necessarily forming an integral number of 16bit words. Verification takes place as follows:

the first byte $C_0$ is the modulo $2^8-1$ sum of all the 0i bytes of the header: $C_0=C_0+Oi$;

the second byte $C_1$ is the modulo $2^8-1$ sum of all the $C_0$ bytes, for each Oi byte: $C_1=C_1+C_0$;

at the end of verification, $C_0$ and $C_1$ must have the modulo $2^8-1$ value 0.

FIG. 14b shows the architecture of two accumulators. The carries are looped from the high to the low orders in order to carry out the modulo $2^8-1$ addition. The C0, C1 registers are updated for each new byte with the same clock Phi. The adder of the accumulator C1 has two carry inputs, one in the case of an overflow of the C0 register and the other in the case of an overflow on itself.

Hardware architecture of the translator according to the invention

Figure 15:
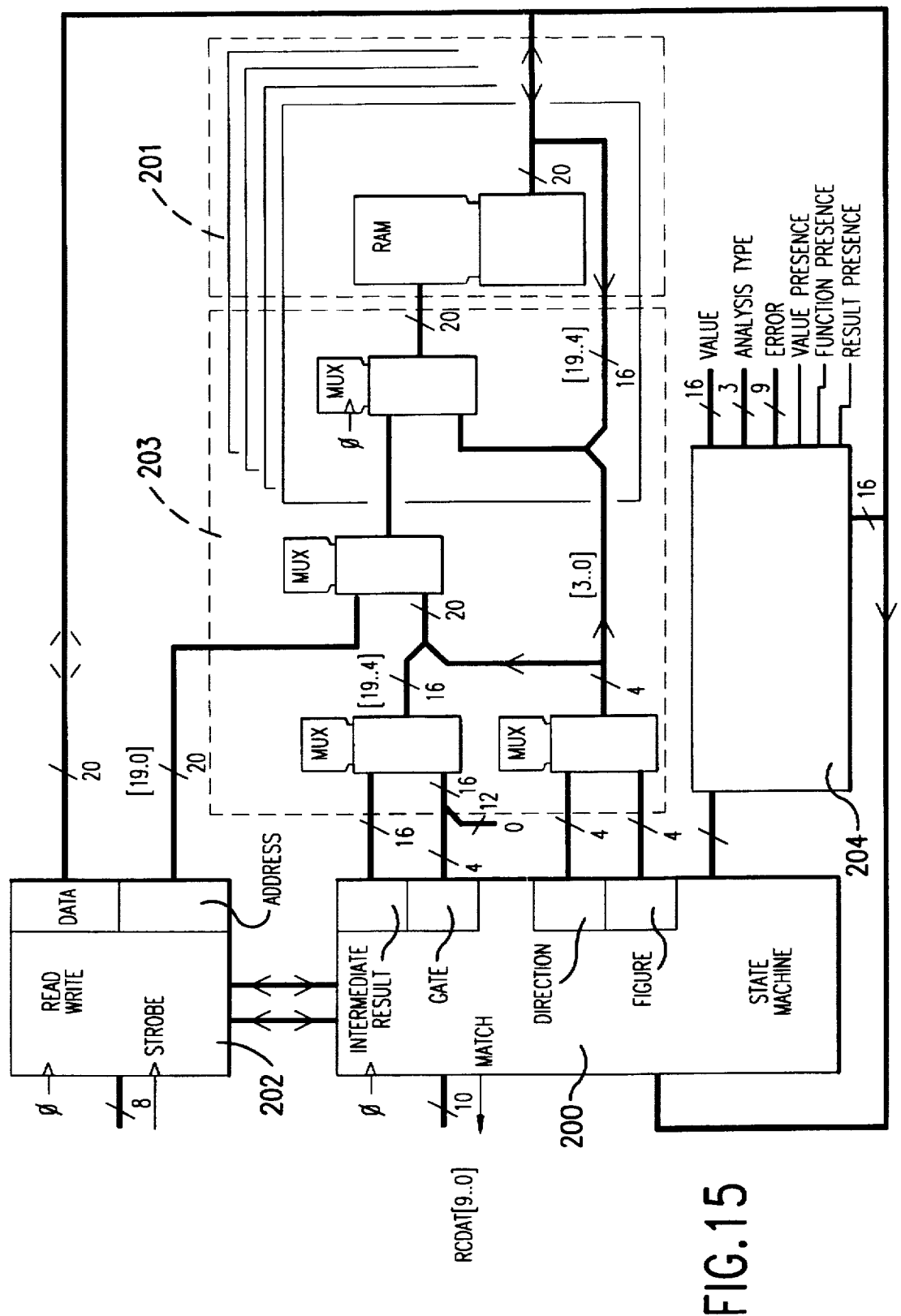
FIG. 15 Shows the hardware architecture of the translator according to the invention.

FIG. 15 illustrates the hardware architecture of the translator, which comprises the following modules: P1 a state machine 200, a RAM 201, a read-write control module 202 making it possible to read and write in the RAM, participate in the RAM-state machine arbitration and optionally to parametrize the state machine.

The different outputs of the state machine corresponding to the intermediate results, the gate register, to the direction and to the segment, as well as the address outputs of the read-write module are connected to the RAM across the data path 203 represented here by several multiplexers.

Other state machine outputs are connected to a result module 204, which is in part read in the memory and in part in the state machine and supplies signal corresponding to the value, the analysis type, the error, the presence value, the presence function and the presence result.

The data accesses of the read-write module and the state machine are connected to the RAM.

The interfaces with the remainder of a system processing the FDDI physical level can be:

the input signals RCDAT(9 ... 0) from a component, as well as the corresponding clocks (symbol at 25 MHz and byte at 12.5 MHz), the match signal for indicating to the component processing the MAC level the recognition of a MAC level address so that it can withdraw it from the ring (stripping), the result of the analysis in the form:
routing path or function on 16 bits,
analysis type performed on 3 bits,
error indication on 9 bits (one bit per error type),
routing path indication,
function indication,
an access for updating the TRIE memory.

In FIGS. 13 and 15 the TRIE data and addresses are implemented with 20 bits, but they could obviously also be implemented with a different number of bits.

In an advantageous construction, the translator is in two parts. The first subassembly carries out the indirection—indexing cycle and groups the memories and address multiplexers. The multiplexers have both a register and amplifier function on the address bus. This bus is impedance matched and the memories and multiplexers are in a surface mounted devices on both sides of a printed circuit board in order to reduce the bus length, whilst all the other subassemblies can be implemented in a programmable logic network.

A TRIE memory updating software able to control several translators corresponding to different physical ports has a volume of approximately 2000 lines in language C, whereof 10% are for basic operations such as the adding or removing of an address or modifying its attributes.

In a generic architecture for applying to the case of an intermediate system of the packet switch type, the interconnection equipment is organized around a device permitting the information exchange between the different access modules formed from three parts (matching to the exchange device, relay and adaptation to the interface in question— LAN, MAN or WAN).

A control module makes it possible to use the complete device. It also handles the processing tasks of the frames defined by the system as not having an excessive time constraint (with respect to the device and its use). For example, the route determination or table exchange frames have time constants of a few seconds to a few dozen or hundred seconds can apply here.

The device according to the invention can be located as close as possible to an LAN interface (LAN relay or LAN adaption function). It can even have interactions with the components controlling the MAC (case of the match signal for FDDI). In the case of WAN, it is either at the interface, or is usable in shared manner by several interfaces in a data bank-type use.

In one of the two modes, it can be shared between several interfaces. The number of the latter is determined whilst taking account of the desired performance constraints (transparent, delay introduced with respect to the optimum solution, etc.).

The apparatus according to the invention can be used for purposes other than the routing of high rate data structures and can in particular be used as a basis for security devices implementing address filtering and for facilitating the implementation of traffic measurement, counting or observation means based on informations analyzed on the fly.

TABLE 1

| Physical level | Entering VP, VC | Output port, VP, VC Switch control (signalling, administration) Wired MAC level |
|---|---|---|
| MAC level | Destination MAC address | Output port, VP, VC |
|  | Source Routing | Bridge control (signalling, administration) Network protocol identification Output port, VP, VC Bridge Control |
| Network protocol identification | LLC, ... | Router control (signalling, administration) Wired network level |
| Network level | Destination address | Output port, VP, VC or destination MAC Router control (address, signalling, administration) |

We claim:

1. A process for analysis of at least part of information contained in a data sequence to supply routing information to a network node for routing of said data sequence either across a network or to an external system for additional processing, comprising the steps of:

(1) receiving bit slices of length k of said data sequence containing routing information pertaining to said data sequence;

(2) providing said bit slices to a state machine;

(3) processing said bit slices to determine an intermediate result causing a state change in said state machine prior to completely receiving said data sequence via a search utilizing successive addressing iterations of a two dimensional TRIE array wherein each line of the array comprises a register of $2^k$ cells.

2. The process according to claim 1, further comprising the preliminary step of storing information in said two dimensional TRIE array that supports several different types of searches.

3. The process according to claim 1, further comprising the step of identifying part of said data sequence as don't care, thereby excluding said part of said data sequence from said search.

4. The process according to any one of claims 1, 2, or 3, wherein step (1) includes the step of receiving bit slices of a data sequence of a source routed type.

5. The process according to claim 4, wherein said step of processing includes the substep of:

performing analysis of a routing type (RT) field of a source routed frame by consulting said TRIE array to supply a faction to an external system to produce or update a routing table stored in the TRIE array if said source routed frame is one of an All Route Explorer (ARE) frame and a Spanning Tree Explorer (STE) frame;

generating an error if a length (LTH) field of said source routed frame has an incorrect value; and precalculating a duration in segments if said source routed frame is a Specifically Routed Frame (SRF).

6. The process according to claim 5, further comprising the step of determining a routing path which must be followed by a source routed frame via analysis of a route designator (RD) zone including route designators comprising a succession of links (LAN identifiers, LANID) and nodes (bridge identifiers, BN) contained in said source routed frame.

7. A process according to claim 6, wherein said determining step comprises:

searching a route designator (RD) zone and recognizing a particular sequence of LAN identifier, bridge identifier, and LAN identifier (LANID, BN, LANID) in said RD zone, comprising the steps of:
ignoring bridge identifiers until a first LANID is recognized;
recognizing a LANID in said RD zone via an adapted programming of said TRIE memory;
analyzing a bridge identifier and LANID that follow said LANID recognized in said RD zone via an adapted programming of said TRIE memory; and
starting said search over if a failure condition is encountered.

8. The process according to claim 7, wherein said starting step comprises:

starting said search over upon encountering a LANID pointing towards a dummy register pointing either towards a following dummy register or towards a gate register.

9. A process according to claim 7, further comprising the step of:

obtaining a routing path via analysis by indirection of a stored intermediate result and indexing by a direction bit previously recorded.

10. A process according to claim 7, further comprising the step of:

detecting a LAN identifier appearing more than once in a LANID, BN, LANID sequence of said RD zone.

11. The process according to claim 1, wherein said step of processing begins prior to completely receiving an address contained in said data sequence.

12. The process according to claim 1, wherein said step of processing includes the substep of determining which protocol of plural protocols corresponds to said data sequence.

13. The process according to claim 1, wherein said step of processing includes the substep of identifying routing information in dependance on information stored in said TRIE array.

14. The process according to claim 1, wherein said step of processing includes the substep of identifying a next TRIE addressing iteration in dependance on information stored in said TRIE array.

15. The process according to claim 1, wherein said step of processing includes the substeps of:

identifying a gate register corresponding to a search type; and commencing said search of said two dimensional TRIE array by specifying said gate register identified.

16. The process according to claim 1, further comprising the step of updating information contained is said two dimension TRIE array during at least one of an off line period and an inactivity period.

17. The process according to claim 1, wherein said step of processing includes the substep of causing said state change in said state machine in relation to one of routing information and a next iteration identified in said processing step.

18. An apparatus for analysis of information contained in a data sequence in order to supply an external system with information needed either for routing or further processing of said data sequence, comprising:

a computer readable memory configured as a TRIE array and connected to a data path;

a read write control module connected to said data path and connected to address lines;

a check sum verification module for verification of different check sums;

a state machine; and a results module connected to said data path and providing data read from at least one of said state machine and said computer readable memory including a value, an analysis type, a possible error, a presence of a value, a presence of a function, and a presence of a result to an external device;

said state machine connected to said data path and operating on data input from said data sequence and data retrieved from said computer readable memory to provide output signals comprising, outputs provided to said computer readable memory including an intermediate result, a gate register, and a direction, said outputs being combined with signals on said data and address lines of said read write control module to provide addressing and data to said computer readable memory, and result outputs provided to said results module;

said TRIE array, based upon at least one of the outputs provided to said computer readable memory, operating to determine an intermediate result causing a state change in said state machine prior to completely receiving said data sequence.

19. An apparatus according to claim 18, which is used in an application a data structure switch or a routing bridge having a FDDI interface.

20. An apparatus according to claim 18, which is used in an application for security devices performing address filtering.

21. An apparatus according to claim 18, which is used in an application device for traffic measurement, counting and/or observation based on information analyzed.

22. An apparatus according to claim 18, wherein said check sum verification module comprises:

an adder having eight first inputs receiving a data byte to be analyzed, eight second inputs, a data output, a carry input, and a carry output;

a first register having said data output of said adder as an input, a signal $\phi_A$ as a clock input, and a data output;

a second register having said data output of said adder as an input, a signal $\phi_B$ as clock input, and a data output;

a multiplexer having each respective data output of said first register and said second register as an input 0 and an input 1 respectively, and having said signal $\phi_B$ as a clock input, and an output provided to said eight second inputs of said adder; and a carry register having said carry output of said adder as a data input and a signal $\phi$ as a clock input and an output connected to said carry input of said adder.

23. An apparatus according to claim 18, wherein said check sum verification module comprises:

a first adder having a first input receiving a data byte to be analyzed, a second input, a data output, a carry input, and a carry output;

a second adder having a first input, a second input, a data output, a first carry input, a second carry input, and a carry output;

a first register having said data output of said first adder as an input, and a data output connected to said second input of said first adder and said first input of said second adder;

a first carry register having said carry output of said first adder as an input, and an output connected to said carry input of said first adder and to said first carry input of said second register;

a second register having said data output of said second adder as an input, and a data output connected to said second input of said second adder;

a second carry register having said carry output of said second adder as an input, and an output connected to said second carry input of said second adder; and a signal $\phi$ being input to said first register, said second register, said first carry register, and said second carry register as a clock input.

24. The apparatus according to claim 18, wherein said TRIE array stores information that supports several different types of searches.

25. The apparatus according to claim 18, wherein said TRIE array determines which protocol of plural protocols corresponds to said data sequence via successive addressing iterations of said TRIE array.

26. The apparatus according to claim 18, wherein said TRIE array, via successive addressing iterations of said TRIE array, identifies one of routing information and a gate register identifying a next addressing iteration corresponding to said data sequence.

* * * * *